O. S. WALKER.
MAGNETIC CHUCK.
APPLICATION FILED AUG. 18, 1909.

1,013,574.

Patented Jan. 2, 1912.
6 SHEETS—SHEET 1.

Witnesses
R. D. Tolman.
Penelope Cumberbach.

Inventor
Oakley S. Walker.
By Rufus B. Fowler
Attorney

O. S. WALKER.
MAGNETIC CHUCK.
APPLICATION FILED AUG. 18, 1909.

1,013,574.

Patented Jan. 2, 1912.

6 SHEETS—SHEET 2.

Witnesses
R. D. Tolman
Penelope Cumberbach

Inventor
Oakley S. Walker
By Rufus B. Fowler
Attorney

O. S. WALKER.
MAGNETIC CHUCK.
APPLICATION FILED AUG. 18, 1909.

1,013,574.

Patented Jan. 2, 1912.
6 SHEETS—SHEET 4.

Witnesses
R. D. Tolman
Penelope Cumberbach

Inventor
Oakley S. Walker.
By Rufus B. Fowler
Attorney

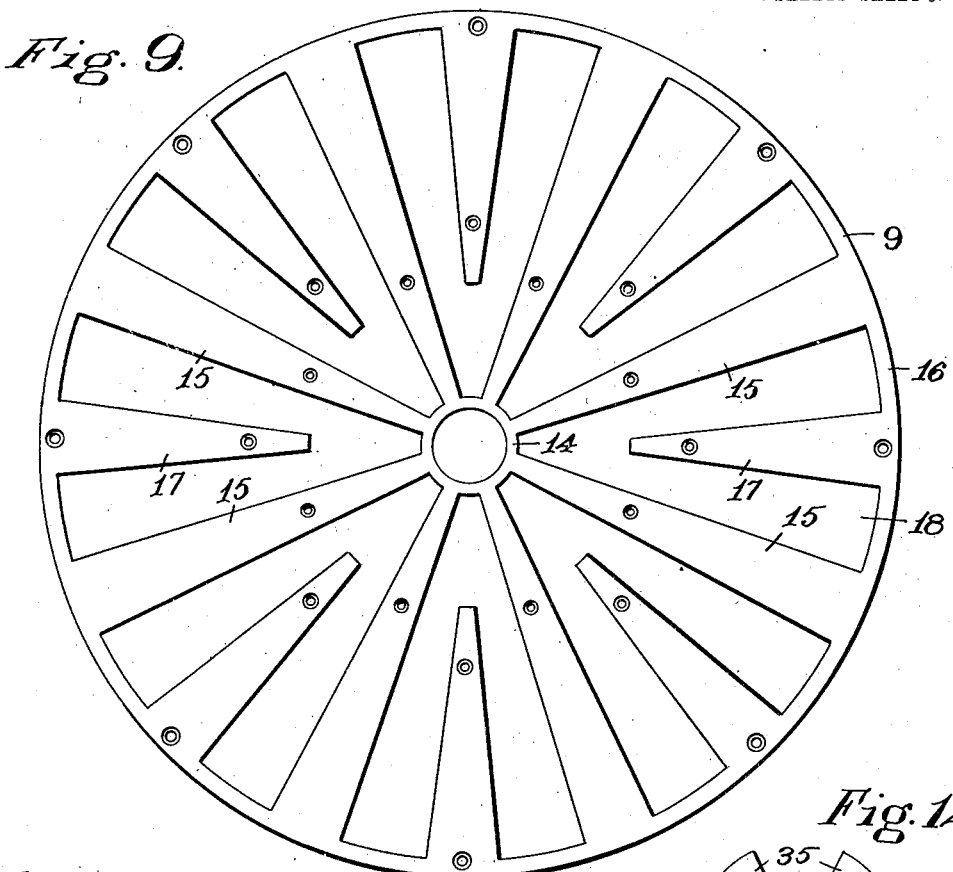
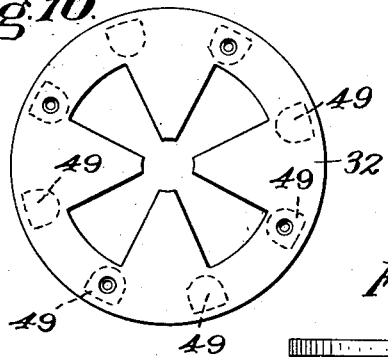
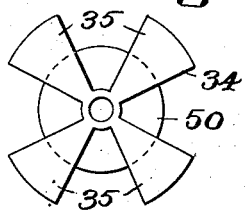

UNITED STATES PATENT OFFICE.

OAKLEY S. WALKER, OF WORCESTER, MASSACHUSETTS.

MAGNETIC CHUCK.

1,013,574.  Specification of Letters Patent.  Patented Jan. 2, 1912.

Application filed August 18, 1909. Serial No. 513,524.

*To all whom it may concern:*

Be it known that I, OAKLEY S. WALKER, a citizen of the United States, residing at Worcester, in the county of Worcester and Commonwealth of Massachusetts, have invented a new and useful Improvement in Magnetic Chucks, of which the following is a specification, accompanied by drawings forming a part of the same, in which—

Figure 1:
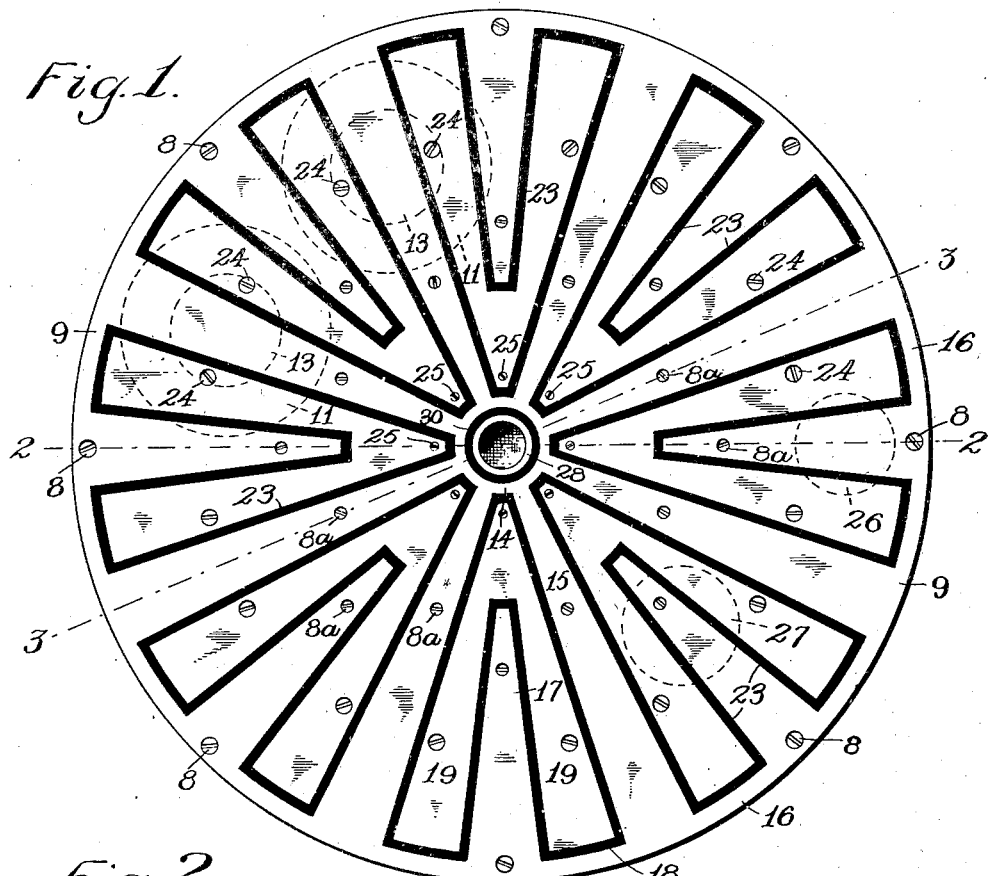
Figure 2:
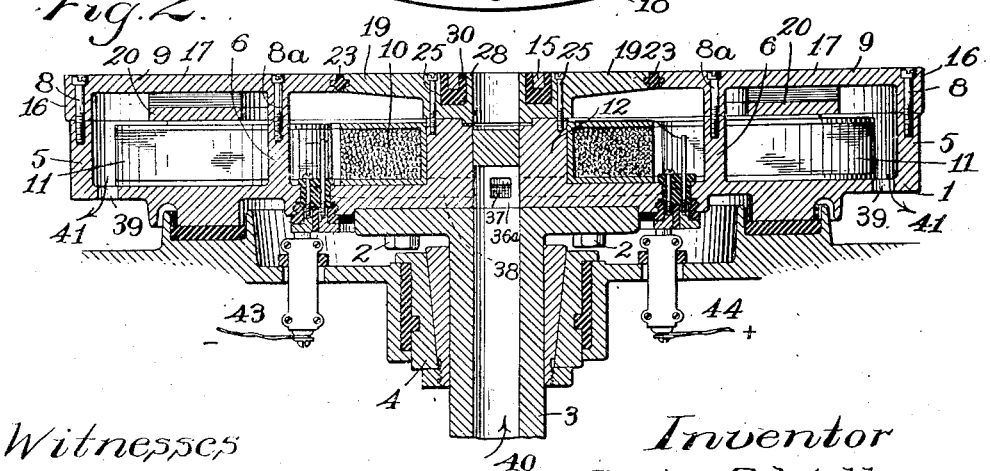
Figure 3:
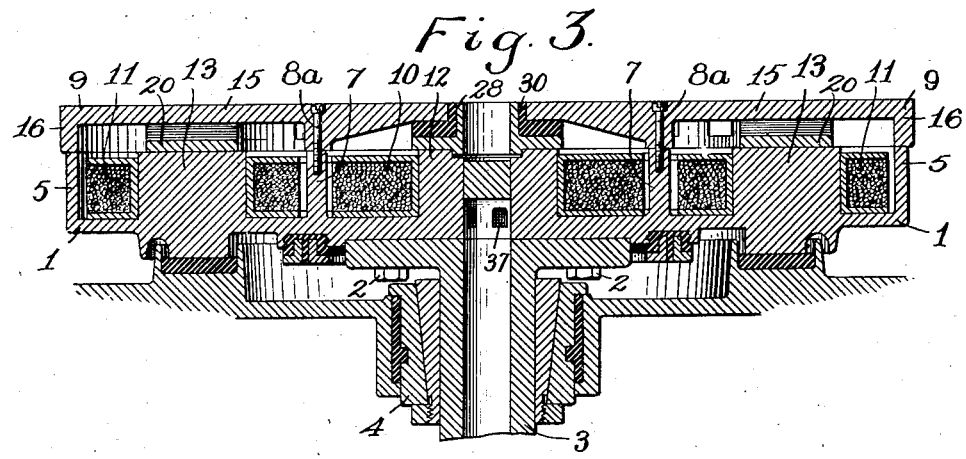
Figure 4:
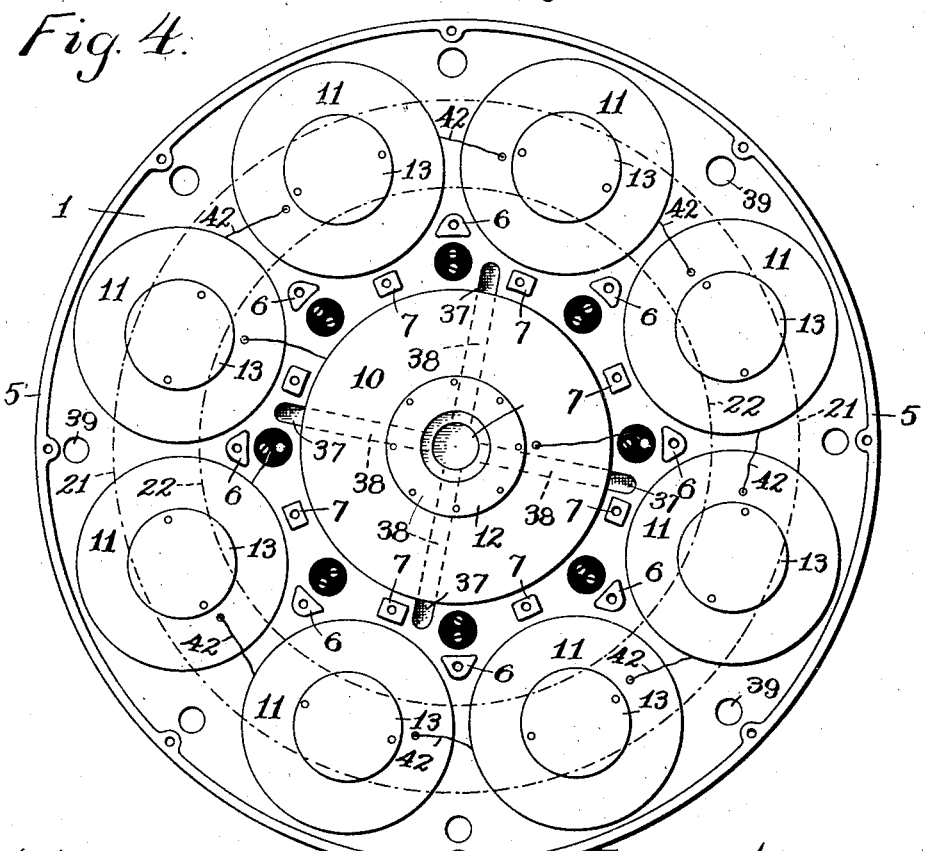
Figure 5:
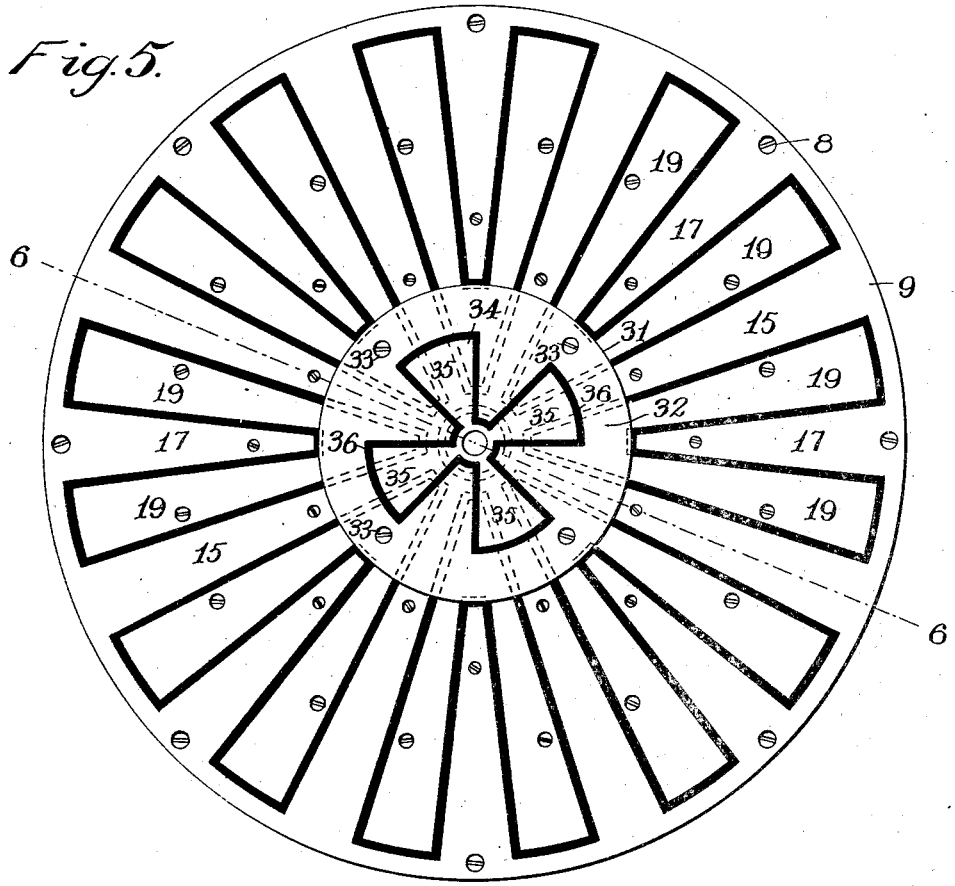
Figure 6:
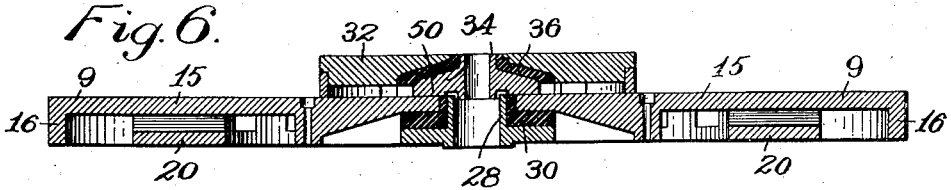
Figure 7:
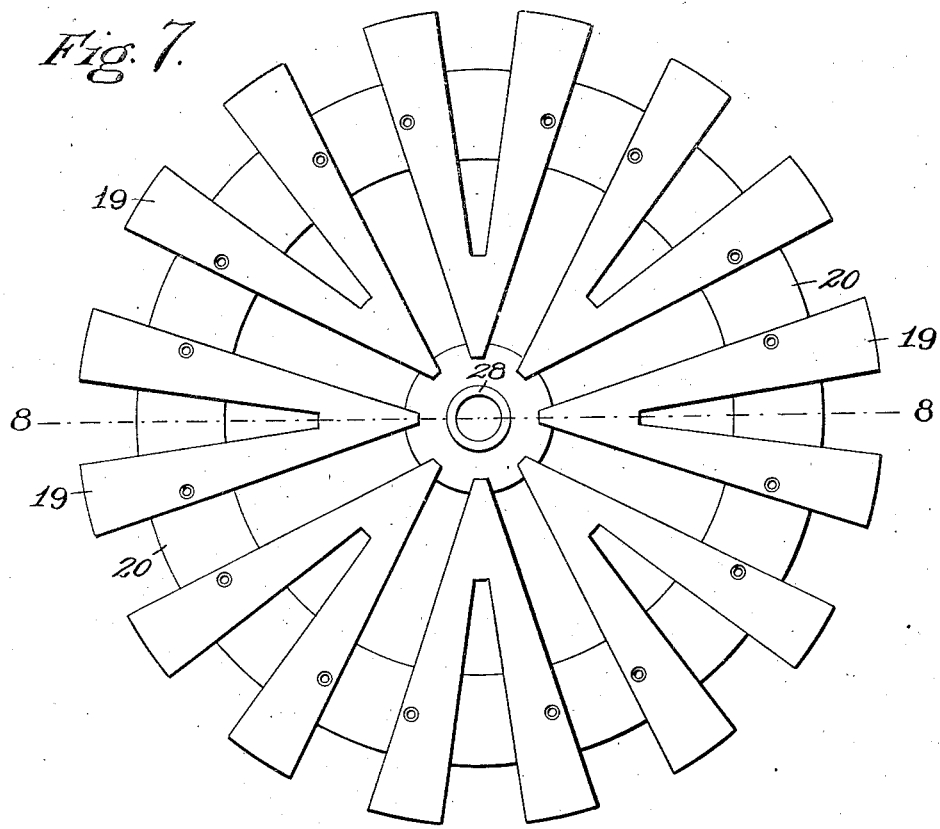
Figure 8:
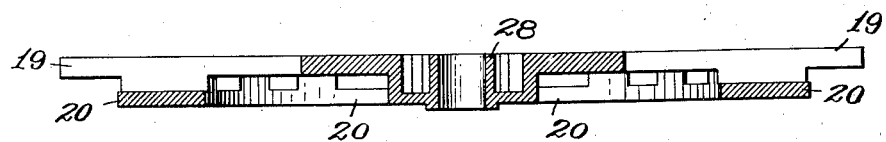
Figure 14:
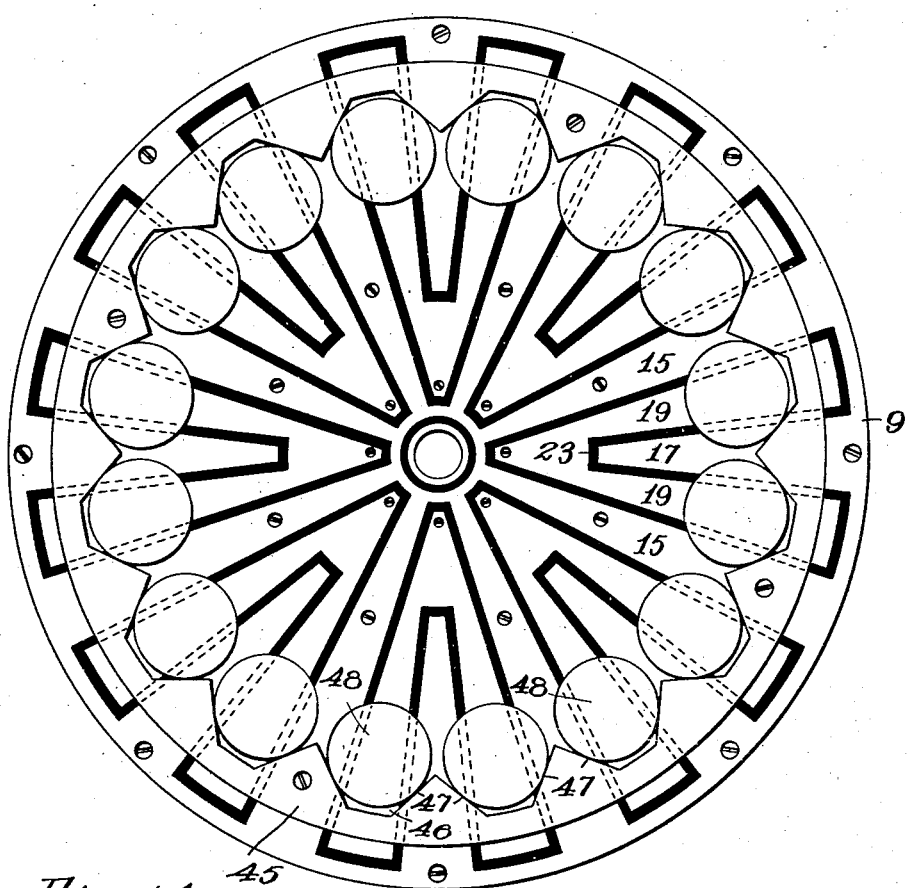

Figure 1 represents a plan view of a magnetic chuck embodying my invention. Fig. 2 is a vertical sectional view on the broken line 2—2, Fig. 1. Fig. 3 is a vertical sectional view on the broken line 3—3, Fig. 1. Fig. 4 is a plan view with the face plate removed, showing the shell or case and spools containing the magnetic coils contained therein. Fig. 5 is a plan view of my improved chuck with a central supplemental magnetic face plate applied thereto. Fig. 6 represents the main and supplemental face plates detached and shown in vertical sectional view on the broken line 6—6, Fig. 5. Fig. 7 is a detached plan view of one of the sections of the main face plate containing the V-shaped pieces 19. Fig. 8 is a side view of the part represented in Fig. 7, shown in sectional view on the broken line 8—8, Fig. 7. Fig. 9 is a detached plan view of the skeleton plate forming a portion of the main face plate of the chuck. Fig. 10 is a detached plan view of the outer section of the supplemental face plate. Fig. 11 is a detached side elevation of that part of the supplemental face plate shown in Fig. 10. Fig. 12 is a detached plan view of the inner portion of the supplemental face plate. Fig. 13 is a detached side elevation of that part of the supplemental face plate shown in Fig. 12. Fig. 14 is a plan view of the magnetic chuck having a notched plate by which small pieces of work are positioned.

Similar reference characters refer to similar parts in the different views.

My present invention relates to that class of magnetic chucks which comprise an electromagnet and work holding faces of opposite polarities, as described in United States Letters Patent issued to me July 21, 1896, No. 564,296, and it relates particularly to the construction of a revolving magnetic chuck provided with a circular work holding face, which is adapted to rotate and carry the iron or steel pieces thereon which are to be operated upon, and it consists in the construction and arrangement of parts as hereinafter described and pointed out in the annexed claims.

Referring to the accompanying drawings 1 denotes a circular shell or case attached by bolts 2 to a rotating hollow spindle 3, preferably journaled in a vertical bearing 4. The shell or case 1 has a peripheral flange 5, and projecting upwardly from the bottom of the shell or case are posts 6 and 7, having their upper ends flush with the edge of the peripheral flange 5 to support a work holding face plate, which is attached to the peripheral flange 5 by bolts 8 and to the posts 6 and 7 by bolts 8ª.

The shell or case 1 and the work holding face plate 9 inclose a chamber to receive a central magnetizing coil of wire 10 and a series of magnetizing coils of wire 11, arranged concentrically around the central coil 10. The magnetizing coils of wire are carried upon spools, the central coil surrounding an iron core 12 integral with the shell or case 1, and the concentric coils are carried upon spools which are mounted upon cores 13 integral with the shell or case 1.

The face plate 9 comprises a skeleton shown detached in plan view in Fig. 9, and consisting of an annular center 14 with radiating bars 15 united at their outer ends by a flange 16, and having between the radiating bars 15 a series of reëntering tapering projections 17 extending from the flange 16 toward the center. Each of said reëntering projections 17 form with the radiating bars 15 a V-shaped opening 18. The face plate is completed by inserting in the V-shaped openings 18 the V-shaped iron piece 19, preferably formed of cast metal and integral with a metal ring 20. The V-shaped pieces 19 with the integral metal ring 20 is shown in plan view in Fig. 7.

In assembling the shell or case 1 and the face plate 9, the metal ring 20 with the V-shaped pieces 19 integral therewith, is placed upon the concentric row of cores 13. The metal ring 20 occupies the position indicated by the concentric broken lines 21 and 22, Fig. 4. The skeleton plate comprising the radiating bars 15 and reëntering projections 17 is then placed in position on the flange 5 of the shell or case and fastened by the bolts 8, 8ª. A narrow gap or space, when the parts are assembled, is left between the V-shaped pieces 19 and the remainder of the face plate which is filled with some suitable nonmagnetic material, such as Babbitt metal, in order to close the gaps and prevent the admission of dirt to the interior of the chuck, as represented by the heavy black lines 23, Fig. 1. The V-shaped pieces 19 and metal ring 20 are attached to the cores 13 by means of bolts 24 and their tips are attached to the central core 12 by means of bolts 25. The skeleton plate inclosing the V-shaped pieces is held out of contact with the magnetic cores 12 and 13, and the two sections of the face plate, namely, that in contact with the magnetic cores 12 and 13 comprising the V-shaped pieces 19, and the skeleton plate inclosing the V-shaped pieces will therefore possess opposite polarities. The magnetic force of the chuck will consequently be exerted between the two sections of the face plate and across each of the gaps or spaces which, in the present instance, are filled with nonmagnetic material, such as Babbitt metal.

If a piece of work is laid upon the face plate, when the several coils of wire have been energized by an electric current, the magnetic force will be exerted to draw the work firmly against the face plate, provided the work spans any of the gaps indicated by the heavy black lines 23, Fig. 1. My present construction is for the purpose of bringing the gaps between sections of the face plate of different polarities nearer together, especially near the outer edge of a circular chuck in order that a multiplicity of small pieces may be held at the same time upon the chuck near its outer edge. For example, when the magnetic force of the chuck is in active operation, a piece of work spanning the gap between one of the radiating bars 15 and one leg of one of the V-shaped pieces 19 will be firmly held, as the two contiguous sections of the face plate are of different polarities. In like manner, a piece of work spanning a gap between one leg of a V-shaped piece 19 and one of the reëntering tapering projections 17 will be firmly held, as these contiguous sections of the face plate are of different polarities.

I have indicated two small pieces of work located in the manner above described in Fig. 1, of the drawings, at 26 and 27. By the construction of the face plate above described I multiply the number of sections of opposite polarities near the periphery of the face plate, thereby enabling a large number of small articles to be held in juxtaposition to each other. The inner tips of the V-shaped piece 19 are united in a concentric ring 28 which is flush with the work supporting surface of the face plate. The inner ends of the radiating bars 15 are likewise united in a concentric ring 14 between which and the ring 28 is a concentric gap 30, thereby forming two concentric rings of opposite polarities at the center of the face plate, and enabling a small piece of work to be held at the center of the face plate.

For certain varieties of work I attach a supplemental face plate to the central portion of the face plate 9, as represented at 31, Fig. 5. The supplemental face plate is constructed of two separate pieces which are shown detached in Figs. 10 and 12. The outermost of these pieces shown at 32, Fig. 10, is attached to the inner tips of the V-shaped pieces 19 by means of screws 33. The under side of the piece 32 is cut away where it passes over the radiating bars 15, so that the polarity of the outer piece is the same as that of the V-shaped piece 19. Inclosed within an opening in the piece 32 is a second piece 34, consisting of a series of radiating wings 35, separated from the outer piece 32 by gaps filled with nonmagnetic material 36 and which is supported directly upon the skeleton face plate comprising the radiating bars 15. The two sections of the supplemental face plate will be of opposite polarities, the outer plate 32 being of the same polarity as the V-shaped pieces 19 of the main face plate, while the inner portion of the supplemental face plate will be of the polarity of the radiating bars 15, and a piece of work held upon the supplemental face plate will be acted upon by the magnetic force generated by the entire series of magnetizing coils.

The hollow shaft 3 communicates with a concentric chamber 36ª, from which radiating passages 37 extend, as indicated by the broken lines 38, Figs. 2 and 4, into the spaces containing the magnetizing coils 11. Openings 39 are provided through the bottom of the shell or case 1 near its outer edge, also communicating with the space containing the magnetizing coils 11. A current of air is forced into the hollow shaft 3 in the direction of the arrow. 40, Fig. 2, in the chamber 36ª, from whence it passes through the radiating passages 37 into the interior of the chuck and around the magnetizing coils 11, escaping through the openings 39 in the direction of the arrows 41. This air may be heated, if desired, and its purpose is to keep the chuck as dry as possible. When it is used to hold the work in the process of grinding, the entire apparatus is flooded with water and it is desirable to prevent, as far as possible, the danger of a short circuit by forcing a continuous current of heated air through the interior of the chuck. In the present instance the magnetizing coils are connected in series by wires 42 and brought into an electric circuit by wires 43 and 44. The connection between the wires 43 and 44 and the magnetizing coils carried in the revolving chuck is made by means of conducting rings attached to the revolving chuck and stationary brushes connected with the wires 43 and 44 in the manner well known in electric transmission, and forms no part of my present invention.

In order to rapidly position a multiplicity of small pieces upon the main face plate, I attached to the face plate a plate 45 having at its edge a series of recesses or notches 46, preferably with diverging sides 47, 47, between which small pieces of work like the washers 48 may be placed. The recesses are so arranged that each individual piece of work 48 will be held by the sides 47, in proper position to overlap contiguous sections of the face plate having opposite polarities.

In the operation of my improved chuck I am able to hold a large number of small pieces of work distributed over the surface of the main face plate, each being readily positioned by the notched plate 45. Other classes of work which require a greater magnetic holding force can be securely held upon the supplemental face plate 31 in which the polarity of the outer portion 32 is maintained by the action of all the magnetizing coils of the chuck, as the portion 32 is in contact by the projections 49 on its under side with all the V-shaped pieces, and consequently possesses the same polarity. The inner portion of the supplemental face plate, comprising the radial wings 35, is of the opposite polarity, as the wings 35 are integral with the circular base plate 50 which bears on the inner ends of the radial bars 15.

I claim,

1. In a magnetic chuck, a case or shell, magnetizing coils contained therein, and a circular face plate for holding the work, consisting of a skeleton plate comprising an annular rim, a center piece, radiating bars, connecting said center and said rim, with reentrant triangular projections between said bars, and V-shaped pieces inclosing said triangular projections, with said V-shaped pieces and said skeleton plate of opposite polarities.

2. In a magnetic chuck, a circular work holding face plate comprising two sections of opposite polarity, one section consisting of an integral skeleton plate having a center piece and an annular rim connected with the center piece by radiating bars, and having triangular projections extending from the rim into each space between the radiating bars, and a second section comprising a center piece, an annular plate, and V-shaped sections integral with said center piece, and said plate, and inclosing said triangular projections with nonmagnetic gaps between the sections of opposite polarity.

3. In a magnetic chuck, a shell or case having a central core, a series of outer concentric cores, magnetizing coils surrounding said cores, a skeleton plate forming part of a work holding face plate having radiating openings, and a second section inclosed in said openings and in contact with said outer series of central core, and with said outer series of concentric cores with nonmagnetic gaps between the sections of opposite polarity.

4. In a magnetic chuck, a work holding face plate comprising two sections of opposite polarity, one of said sections consisting of a skeleton plate having a rim, a center piece, radiating connecting bars, a reëntrant projection between said bars, the other of said sections consisting of a center piece, a concentric annular plate and V-shaped pieces integral at their apices with said center piece, and connected near their outer ends with said annular plate.

5. In a magnetic chuck, a work holding face plate comprising two sections, one of said sections consisting of a skeleton plate having a center piece, an outer rim, connecting radiating bars, reëntrant projections from said rim between said radiating bars, the second section consisting of a center piece, a series of V-shaped pieces connected at their apices with said center piece, an annular plate connecting said V-shaped pieces, and magnetizing coils with inclosed magnetic cores with said second section.

6. In a magnetic chuck, a shell or case, having a central magnetizing coil, a series of outer magnetizing coils, cores inclosed by said coils, a work holding face plate comprising sections of opposite polarity with radial intervening gaps of nonmagnetic material, one of said sections being in contact with both said central core and said outer series of cores.

7. In a magnetic chuck, a main work holding face plate consisting of sections of opposite polarities arranged radially about the center of the face plate, and a concentric supplemental face plate consisting of two sections, one of said sections being in contact with all the sections of the main face plate of one polarity, and the other of said sections being in contact with all the sections of the main face plate of the opposite polarity.

8. In a magnetic chuck, a series of magnetic cores, a main face plate having its surface divided into sections of alternating polarity, a smaller work holding supplemental face plate, consisting of two sections, with one of said sections contacting with all the sections of the main face plate of one polarity, and the other of said sections contacting with all the sections of the main face plate of the opposite polarity.

9. In a magnetic chuck, a main work holding face plate having a multiplicity of sections of opposite polarities, a supplemental work holding face plate having one portion contacting with one or more sections of the main face plate of one polarity, and having another portion contacting with one or more sections of the main face plate of the opposite polarity.

10. In a magnetic chuck, a work holding face plate having its work supporting surface divided into alternating sections of opposite polarities with nonmagnetic gaps, a work positioning plate of nonmagnetic material attached to said face plate and having recesses to receive the work, each of said recesses spanning one or more of said nonmagnetic gaps.

11. In a magnetic chuck, a work holding face plate having its work supporting surface divided into alternating sections of opposite polarity, and a work positioning plate having recesses to receive individual pieces of work spanning portions of sections of opposite polarity.

12. In a magnetic chuck, a shell or case, a work holding face plate attached to said shell or case and inclosing a chamber for magnetic coils, a central opening, in said shell or case for the admission of air, radial passages from said central opening to said chamber, and openings for the escape of air at the outer edges of said chamber.

13. In a magnetic chuck, a shell or case containing a series of magnetizing coils, a rotating hollow shaft supporting said shell or case, a passage in said shell or case between said hollow shaft and the space containing said magnetizing coils, and an opening in said shell or case communicating with said space.

OAKLEY S. WALKER.

Witnesses:
RUFUS B. FOWLER,
PENELOPE COMBERBACH.